United States Patent
Gosparini et al.

(10) Patent No.: US 12,269,926 B2
(45) Date of Patent: Apr. 8, 2025

(54) PROCESS OF PRODUCTION OF A POLYMER PRODUCT

(71) Applicant: I.BLU S.R.L., Pasian di Prato (IT)

(72) Inventors: Paolo Gosparini, Fagagna (IT); Mirko Bottolo, San Vito al Tagliamento (IT); Elia Gosparini, Fagagna (IT)

(73) Assignee: I.BLU S.R.L., Pasian di Prato (IT)

( * ) Notice: Subject to any disclaimer, the term of this patent is extended or adjusted under 35 U.S.C. 154(b) by 819 days.

(21) Appl. No.: 17/610,475

(22) PCT Filed: May 12, 2020

(86) PCT No.: PCT/IT2020/050114
§ 371 (c)(1),
(2) Date: Nov. 11, 2021

(87) PCT Pub. No.: WO2020/230177
PCT Pub. Date: Nov. 19, 2020

(65) Prior Publication Data
US 2022/0315724 A1     Oct. 6, 2022

(30) Foreign Application Priority Data
May 13, 2019   (IT) .................. 102019000006770

(51) Int. Cl.
C08J 11/06     (2006.01)

(52) U.S. Cl.
CPC ............ C08J 11/06 (2013.01); *C08J 2323/06* (2013.01); *C08J 2323/12* (2013.01); *C08J 2367/03* (2013.01)

(58) Field of Classification Search
USPC ........................................... 521/48
See application file for complete search history.

(56) References Cited

U.S. PATENT DOCUMENTS

| | | | |
|---|---|---|---|
| 5,554,207 | A | 9/1996 | Bogdan et al. |
| 6,184,427 | B1 * | 2/2001 | Klepfer ............... C10G 1/10 201/2.5 |
| 6,635,093 | B1 | 10/2003 | Schoen et al. |

FOREIGN PATENT DOCUMENTS

EP     3418400 A1     12/2018

OTHER PUBLICATIONS

Monika Kuznia et al., "Research on Thermal Decomposition of Waste PE/PP", Inzynieria Chemiczna I Procesowa/Chemical and Process Engineering, vol. 34, No. 1, Mar. 1, 2013, pp. 165-174, XP055657775, ISSN: 0208-6425.

Minoru Asanuma et al., "Establishment of Advanced Recycling Technology for Waste Plastics in Blast Furnace", JFE Technical Report, nr. 13, May 1, 2009, XP055658656, URL:https://www.jfe-steel.co.jp/en/research/report/013/pdf/013-07.pdf, Sections 2.2, 3, 3.1; Figures 7-9.

International Search Report and Written Opinion for PCT Patent Application No. PCT/IT2020/050114 dated Aug. 4, 2020. 11 Pages.

* cited by examiner

*Primary Examiner* — Terressa Boykin
(74) *Attorney, Agent, or Firm* — MCANDREWS HELD & MALLOY, LTD

(57) ABSTRACT

Method to produce a polymeric product starting from a primary heterogeneous mixture comprising polymeric material, comprising fragmentation into desired sizing, mechanical primary selection of the fragmented material and plastification, obtaining a densified material which is then subjected to quenching.

15 Claims, No Drawings

PROCESS OF PRODUCTION OF A POLYMER PRODUCT

FIELD OF THE INVENTION

Embodiments described here concern a method to produce a polymeric product which can, in particular, be used as a substitute for fossil sources, for example but not restricted to the steel industry. For example, a possible use of the polymeric product described here can be in a method to produce metal products starting from ferrous material, by means of an electric arc furnace (EAF), or a blast furnace (BF) or direct reduction processes (DRP), as a polymeric material to at least partly replace the fuel provided in the preheating and melting of the ferrous material and/or to at least partly replace the carbon sources used to refine the molten metallic material.

Another example of the possible use of the polymeric product described here can be in a thermal or catalytic conversion process, for example gasification or pyrolysis.

BACKGROUND OF THE INVENTION

It is known that the market is currently showing a growing need for energy sources and chemical principles deriving from the use of fossil fuels. For example, in the steel industry there is a great need for fossil sources, used both as energy sources, for example to generate heat, and also as sources of chemical substances, for example to generate the reducing agents necessary for the production of ferrous and non-ferrous metal products, such as aluminum, copper or other.

For example, the use of PCI (Pulverized Coal Injected), MET coke, GPC (Green Petroleum Coke) is known for the above purposes.

It is known that there is a growing need to reduce the consumption of fossil sources, both because of their progressive depletion, and also because of the costs and high environmental impact associated with their extraction, transport, refining, processing and combustion.

Furthermore, these fossil sources are becoming less and less usable in a perspective of sustainable development and circular economy.

For these and other reasons, the growing need for a new generation of fuels is known, which combine high energy efficiency with low environmental impact.

In this scenario, it is known to use polymeric products, for example deriving from the separate collection of waste from urban and special plastic packaging, to at least partly replace traditional fossil sources.

The use of these polymeric products, in particular for example in the steel industry, has advantages connected to their immediate and widespread availability and their ease of use; it also contributes to the disposal and/or recycling of plastic materials otherwise intended for landfills and/or waste-to-energy plants, and contributes to creating a circular economy.

This use therefore has a double effect of reducing pollution: reusing waste plastic materials instead of incinerating and/or accumulating them in landfills, and reducing the need to use fossil sources.

Document U.S. Pat. No. 5,554,207 describes the production of a product that can be used in furnaces intended to recover iron present in iron oxides. The iron oxide is mixed with a thermoplastic material insoluble in water and heated by melting the plastic to obtain a binder for the iron oxide. The material thus obtained is fed back to the furnace to recover the iron. Among the thermoplastics used there is PVC, which is notoriously problematic since it contains 50% in weight of chlorine. Powders and thermoplastics are processed at temperatures between 150° C. and 260° C. This temperature range, during the agglomeration step, does not allow the PVC to dechlorinate, because in order to remove the chlorine efficiently it is necessary to go to temperatures between 300° C. and 400° C. Furthermore, this document does not provide any selection upstream of the agglomeration/pelletizing step. The absence of selection implies that there is no control over the pollutants present in the thermoplastics, which can introduce potentially harmful elements, such as Cl and S, into the steel process. Furthermore, the lack of selection in this known document does not guarantee constancy in the chemical composition and in the lower calorific value (LCV), which is important in the steel industry for example. Finally, the conglomerate described here is not easily transportable to be added to the steel process, since the agglomerated/pelletized thermoplastics tend to maintain the temperature at which they were processed, and tend to conglomerate with each other, as they are still close to the softening temperature. The large molten masses generated are highly problematic for movement and related fire risks.

Document U.S. Pat. No. 6,635,093 discloses a method to make pelletized fuel containing plastic and cellulose, by recycling flows of domestic or industrial waste material. The pelletized fuel can be used as blast furnace fuel. The plastics contained in this fuel are derived from waste streams, they constitute at least 60% of the total, of which preferably at least 70% of the total plastics are polyethylene (PE). During the pelletizing process, the plastics, and possibly the cellulose, reach temperatures between 80° C. and 125° C. These temperatures, however, are not sufficient to obtain complete melting of both the PE and also polymers other than PE and, therefore, the pelletized product obtained is heterogeneous and not completely conglomerated. Consequently, the material is not uniform, it is partly melted and has relatively low density and therefore is not easily transportable. The fact that it contains unmelted fragments of plastic causes the pellet to fracture if subjected to impacts during transport, to free some heterogeneous fragments, shreds of PET, for example, from the molten mass, and to facilitate the formation of clogging of the injection line, for example, in the blast furnace. Furthermore, the stream of waste used is not subjected to selection based on the type of material, but is subjected to screening, deferrization and shredding. This means that there may be undesirable components therein such as PVC; the chlorine contained in it cannot be removed because the process temperatures, in this case as well, are too low and do not allow it. Since the process temperatures are low, the moisture content is also high, between 2 and 10%, a value that is not compatible with the steel application since the thermal energy would lead to the evaporation of the water and would not melt the mineral iron. In this case too, no type of cooling is specified. The increasing cellulose content in the fuel described here has the effect of lowering the lower calorific value and, in addition to this, considering the absence of selection of the material upstream of the screening, the lower calorific value will be completely inconstant. Furthermore, the cellulose fraction present in the fuel can cause a reduction in the lower calorific value, a parameter which must necessarily be kept high so that, for example, the adiabatic flame temperature does not drop in the blast furnace application. The addition of cellulose always brings a potential increase in ash, given the mineral fillers contained in paper, for example, which are residual downstream of combustion and entail a reduction in permeability, for example, in the blast furnace.

Document EP-A-3.418.400 describes a method to produce cast iron in a blast furnace, using pellets containing thermoplastic materials. The pellets consist, in particular, of plastic material varying between 50 and 70% in weight, of which PE is at least 60% in weight. There is cellulosic material present from 30 to 50% on the weight of the product. In general, the method described in this document has disadvantages and drawbacks in common with document U.S. Pat. No. 6,635,093 discussed above.

The article by Monika Kuznia et al., "Research on thermal decomposition of waste PE/PP", Inzynieria Chemiczna I Procesowa/Chemical and Process Engineering, vol. 34, no. 1, 1 Mar. 2013 describes the use of plastic PE/PP waste from urban waste in the steel industry, in particular by injecting granules or pellets into the blast furnace. This document has limits connected to the lack of cooling, absence of dechlorination, absence of selection of the type of materials upstream of the production of the granules and, therefore, has the disadvantages and drawbacks already discussed in relation to these aspects in documents U.S. Pat. Nos. 5,554,207, 6,635,093 and EP-A-3.418.400.

The document by Minoru Asanuma et al., "Establishment of Advanced Recycling Technology for Waste Plastics in Blast Furnace", JFE Technical Report n. 13, 1 May 2009 discloses the use of plastic waste in the blast furnace. This document has limits connected at least to the absence of selection of the type of materials contained in the flow of plastic waste and, therefore, has the disadvantages and drawbacks already discussed in relation to this aspect in documents U.S. Pat. Nos. 5,554,207, 6,635,093 and EP-A-3.418.400.

It is therefore necessary to develop methods to produce polymeric products which encourage their use, reducing their production costs and improving their quality.

One purpose of the present invention is to develop a method for the production of a polymeric product, starting from plastic material, for example waste, which can be put back on the market for specific uses, for example in the steel industry.

One purpose of the present invention is to provide a method for the production of a polymeric product which can at least partly replace fossil sources in processes for steel applications.

Another purpose of the present invention is to provide a method that is economical, so as to reduce the costs connected with the production of recycled plastic materials, to make them become more advantageous compared to the use of fossil sources.

Another purpose of the present invention is to provide a method which is simple to carry out, economical and which allows to treat, quickly and easily, large quantities of polymeric material, for example, deriving from the collection of waste from urban and special packaging.

Another purpose of the present invention is to provide a method which is efficient, reducing to a minimum the losses of plastic material in the processing steps.

Another purpose of the present invention is to provide a method which can be integrated with different production and recycling cycles of plastic materials, for example by reusing the processing waste.

Another purpose of the present invention is to provide a method able to produce a polymeric product which overcomes the limitations of the plastic products currently marketed, for example, in the steel industry.

Another purpose of the present invention is to provide a method able to produce a polymeric product with constant chemical characteristics thanks to a sophisticated selection process after shredding.

Another purpose of the present invention is to provide a method able to produce a polymeric product characterized by the almost zero presence of pollutants and/or materials which can compromise the performance of the product, for example, in the steel industry.

Another purpose of the present invention is to provide a method able to produce a polymeric product that can be moved and marketed immediately after shredding, thanks to the quenching operation.

Another purpose of the present invention is to provide a method able to produce a polymeric product by means of optimized densification through the addition of a polymeric corpuscular material, which optimizes and maximizes the properties of the final polymeric product.

Another purpose of the present invention is to provide a method able to produce a polymeric product with the addition of a product consisting mainly of iron oxides deriving from the rolling process of metal products.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, the present invention concerns a method to produce a polymeric product starting from a primary heterogeneous mixture comprising polymeric material, which overcomes the limits of the state of the art and eliminates the defects present therein.

The method of the present invention comprises:
  fragmentation into desired sizing of a primary heterogeneous mixture comprising polymeric material, obtaining a fragmented material of the desired sizing;
  mechanical primary selection, waterless, of the fragmented material to remove metallic material, non-polyolefin polymers and non-polymeric foreign fraction;
  subjecting the fragmented material to plastification, obtaining a densified material;
  subjecting the densified material to quenching, at least by means of air cooling carried out with pneumatic transport, obtaining a densified and cooled material which constitutes the polymeric product.

One embodiment of the quenching provides that the hot densified material, transported pneumatically for air cooling purposes, is simultaneously subjected to a granulation process able to maximize the heat exchange and cool the polymeric product. In particular, the granulation process can provide to shred the material in a shredder.

In a possible other embodiment, the hot densified material is subjected to the granulation process being mixed together with an auxiliary plastic additive that has a moisture content able to speed up the cooling of the polymeric product without compromising its properties.

According to other embodiments, after cooling the method can provide to further fragment the polymeric product obtained into a desired sizing.

In some embodiments, the polymeric product can comprise two or more of following polymers: polyethylene (PE), polypropylene (PP), high-density polyethylene (HDPE), low-density polyethylene (LDPE).

In still further embodiments, the polymeric product can comprise elastomers, such as by way of example natural rubber (NR) or styrene-butadiene rubber (SBR).

Advantageously, the polymeric product of the present invention can be used in the steel industry in at least partial replacement of fossil sources, as a fuel and/or as a carbon source.

Another example of possible use of the polymeric product described here can be in a thermal or catalytic conversion process, for example gasification or pyrolysis.

In some embodiments, the primary heterogeneous mixture can comprise virgin and/or waste materials and/or plastic waste.

This characteristic allows to obtain a method that allows to work waste plastic materials or plastic waste, putting them back on the market for specific uses, for example in the steel industry, or in a thermal or catalytic conversion process, and promoting the development of a virtuous mechanism that contributes to the creation of a circular economy.

In some embodiments, the auxiliary plastic additive which can be used for example in implementations that provide quenching can comprise at least in part quantities of sinking material originating from operations of flotation of plastic material in water, for example used in the field of water purification.

In some embodiments, the auxiliary plastic additive which can be used in the quenching can comprise at least in part quantities of sinking material originating from operations of flotation of plastic material in water, for example used in the selection processes in other cycles of working plastic material.

Advantageously, the method of the present invention can be integrated with different production and recycling cycles of plastic materials, or also with other waste treatment methods. According to another aspect of the present invention, before the plastification the fragmented material can be mixed with a corpuscular polymeric material, with dimensions and sizing smaller than those of the fragmented material.

This characteristic allows to optimize the plastification process, since it reduces the presence of empty space in the fragmented material and in the plastifier.

DESCRIPTION OF SOME EMBODIMENTS

We will now refer in detail to the various embodiments of the invention. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description can provide other embodiments and can be obtained or executed in various other ways. We must also clarify that the phraseology and terminology used here is for the purposes of description only, and cannot be considered as limitative.

The Applicant has developed a method to produce a polymeric product, which can for example be used in the steel industry, preferentially but restrictively, in order to at least partly replace fossil sources, or for example in a thermal or catalytic conversion process, for example gasification or pyrolysis.

The method in accordance with the present description provides to produce a polymeric product starting from a primary heterogeneous mixture comprising polymeric material. Such method comprises:
- fragmentation into desired sizing of a primary heterogeneous mixture comprising polymeric material, obtaining a fragmented material of the desired sizing;
- mechanical primary selection, waterless, of the fragmented material to remove metallic material, non-polyolefin polymers and non-polymeric foreign fraction;
- subjecting the fragmented material to plastification, obtaining a densified material;
- subjecting the densified material to a quenching operation at least by means of air cooling carried out with pneumatic transport, obtaining a densified and cooled material which constitutes the polymeric product.

According to other embodiments, the method, after cooling by quenching, can provide to fragment the polymeric product into desired sizing.

In other embodiments, however, the method does not provide the additional fragmentation after cooling by quenching, and the polymeric product is supplied and made available for the applications required in the shape and dimensions obtained downstream of plastification and cooling.

In some embodiments, the polymeric product obtainable by means of the present invention can be advantageously used as a fuel, for example in processes for producing metal products which, in particular, provide workings at high temperatures, for example reached by means of burners, lances, furnaces.

In some embodiments, the polymeric product obtainable by means of the present invention can be advantageously used as a carbon source, for example to generate reducing agents, such as carbon monoxide or syngas, in processes for producing metal products.

In some embodiments, the polymeric product obtainable according to the present invention can have different shapes and/or dimensions, according to requirements; for example, the polymeric product can be shaped as spheres, pellets or granules of variable diameter, or also in cylindrical, discoid or elongated shapes, flakes, agglomerate, chips, or be in powder form, or still other desired forms.

In some embodiments, the polymeric product obtainable according to the present invention can be obtained finely ground, shredded or pulverized, for example to be picked up and moved by flows of air and/or gas at high pressure or at high speed.

In some embodiments, the polymeric product can be a plastic polymeric product.

In some embodiments, the polymeric product can include a polymeric fraction, which for example can be present in a percentage higher than 50%, preferably higher than 65%, more preferably higher than 80%, even more preferably higher than 90%, more in particular higher than 95% in weight on the dry sample, and a non-polymeric fraction in complementary percentage.

In some embodiments, the method described here can provide, before the plastification, to add to said fragmented material a quantity lower than 50%, preferably lower than 35%, even more preferably lower than 20% on dry weight of the fragmented material, of a product consisting mainly of iron oxides deriving from the rolling process of metal products. This product is of a fine sizing, ranging from 0 to 5 mm, and preferably consists of at least 80% on dry weight of Fe oxides, preferably at least 85% on dry weight, even more preferably at least 90% on dry weight. This addition is aimed at making the process, for example a steel process, efficient.

In some embodiments, the polymeric fraction can comprise two or more of the following polymers: polyethylene (PE), polypropylene (PP), high density polyethylene (HDPE), low density polyethylene (LDPE), polyethylene terephthalate (PET).

In still further embodiments, the polymeric product can comprise elastomers, such as by way of example natural rubber (NR) or styrene-butadiene rubber (SBR).

In possible embodiments, the polymeric product obtainable according to the present invention can comprise a chlorine content not higher than 3.5%, preferably not higher than 2%, more preferably not higher than 1%, even more preferably not higher than 0.8%, referred to the dry sample after 4 hours of drying at 105° C., in accordance with UNI EN 15408 standard.

In still further embodiments, the polymeric product of the present invention can have a calorific value no lower than 20 MJ/Kg, in particular no lower than 30 MJ/Kg, referred to the dry sample after 4 hours of drying at 105° C., in accordance with UNI EN 15400 standard.

In some embodiments, the production method described here provides to initially supply a primary heterogeneous mixture of materials to be worked, comprising polymeric material.

The primary heterogeneous mixture can be heterogeneous with regards to the shapes, composition, density, consistency and origin of the materials that it consists of.

In some embodiments, the primary heterogeneous mixture can comprise plastic materials, both mixed plastic waste, and recovered mixed plastics, and also virgin materials, that is, not waste, recycled or from refuse.

In some embodiments, the plastic materials can comprise urban and/or special waste, of a heterogeneous type and possibly with a high plastic content, for example packaging, disposable plastic objects, plastic waste in general.

In some embodiments, the plastic materials can come from waste selection, disposal and/or recycling plants where they have been previously collected and subjected to one or more recovery operations.

For example, a typical separation that occurs in such plants advantageously separates recyclable polymers, for example because they lend themselves to be melted again and worked to produce semi-finished and/or finished products, and plastic polymers that are not traditionally recyclable, for example because they cannot be traced back to a single family of polymers.

The fraction of plastic polymers made up of several families of polymers is preferably the starting material treated in the following invention.

The applicability of the production method is not limited by the fact that the primary heterogeneous mixture comprises waste from mixed plastic scraps, since virgin and/or homogeneous plastic materials can also be worked.

Furthermore, the applicability of the method of the present invention is not limited by the fact that the primary heterogeneous mixture comprises only plastic materials, since other types of materials may also be present.

In the primary heterogeneous mixture it is therefore possible to identify a plastic fraction, substantially comprising plastic materials, and a non-plastic fraction.

The plastic fraction can comprise polymers, thermoplastic polymers, thermosetting polymers, elastomers, polyolefins, or mixtures thereof, or other types of their combinations.

The plastic fraction can comprise two or more of the following polymers: polyethylene (PE), polypropylene (PP), high density polyethylene (HDPE), low density polyethylene (LDPE), polyethylene terephthalate (PET).

The plastic fraction can also comprise styrene butadiene rubber (SBR), natural rubber (NR), or mixtures or other types of combinations thereof.

The non-polyolefin fraction of the primary heterogeneous mixture can comprise substances suitable to supply additional characteristics to the polymeric product, in such a way as to improve or extend its applicability of use or to optimize the production process itself.

In some embodiments, the method of the present invention provides that the primary heterogeneous mixture is fragmented, for example shred by a shredder, a grinder, or ground or using another fragmentation device, thus obtaining a fragmented material, of desired sizing, also called leaf by the person of skill.

Such fragmentation operation can be set in such a way as to supply fragmented material with the most homogeneous sizing possible, to optimize the subsequent workings, such as for example extrusion.

In some embodiments, the fragmented material can be subjected to mechanical primary selection as described above. Such mechanical primary selection, carried out for example by mechanical separation means, is able to at least partly remove possible unwanted components present in the polymeric mixture.

In some embodiments, the primary selection can be carried out by means of a separator of metal bodies with induced currents, or magnetic separator.

In other embodiments, the primary selection can be carried out by means of a gravity decanter which, advantageously, selects the flow of plastics on the basis of the density at which the machine is parameterized. By way of example, the gravity decanter is able to exclude from the flow of material all those plastic and non-plastic bodies that have a density higher than that of polyolefins, allowing to process only the plastics suitable for the process, for example, a steel process, and for example excluding very dense plastics (PET, PVC), non-polymer bodies (stones, wood, paper, fabric) and other foreign fractions.

In yet other embodiments, the primary selection can also be carried out by means of an optical reader located above a conveyor belt which analyzes the flow of shredded plastics during the movement operation. By way of example, the scanner of the optical reader irradiates the plastics passing on the conveyor belt, analyzes the wavelength of the reflected waves and according to a known technique identifies the type of polymer for each of the fragments below. Depending on the selection target of the optical reader, at the end of the conveyor belt a jet of compressed air is activated in the nozzle in correspondence with the passage of the target polymer identified by the optical reader, excluding it from the flow of polyolefins directed to the plastification station.

The embodiments of primary selection described here are advantageously used to exclude, from the flow of fragmented plastic material, materials which compromise the densification and/or shredding process downstream, and which are not suitable for the process, for example a steel process, such as polyvinyl chloride (PVC), fabrics and paper. Such materials excluded from the process flow are unsuitable or not very suitable for being processed, for example, by means of plastification, because they have a melting temperature higher than the working temperature of the plastifier, such as for example metallic material.

Furthermore, such unwanted components can comprise non-polyolefin and/or thermosetting polymers, which can decompose or carbonize at the working temperatures of the plastifier, making the method less efficient.

Such unwanted components can also comprise non-plastic components, which are incompatible with the plastic material.

In some embodiments, the primary selection can be performed by means of techniques that do not involve the use of water.

This characteristic allows to keep the moisture or water content present in the final polymeric product low.

Advantageously, this allows to use the final polymeric product in applications for which a controlled water content is required, such as for example those in the steel industry.

Advantageously, these selection operations allow, starting from a heterogeneous flow of plastics deriving, for example, from urban collection of domestic waste, to obtain a polymeric product with constant chemical characteristics, such as % C, % H obtained by means of UNI EN 15407:2011 standard.

Advantageously, these selection operations allow, starting from a heterogeneous flow of plastics deriving, for example, from urban collection of domestic waste, to obtain a polymeric product with a content of pollutants (such as Cl, S, Hg, Cd, Pb) that is extremely low and compatible with, for example, a steel application or for thermal or catalytic conversion processes.

The following Table 1 shows the results of the analysis of parameters of polluting compounds Cl, S, Hg, Cd, Pb in three samples (1, 2, 3) of polymeric product obtained, which have by way of example a polymeric fraction content greater than about 95% in weight. The last column shows the type of test used, where necessary. In the case of the polymeric fraction content, it should be noted that other possible test methodologies are ASTM E 1252, product analysis or another methodology possibly adopted according to requirements.

TABLE 1

| Sample | 1 | 2 | 3 | Methodology |
|---|---|---|---|---|
| Polymeric fraction content (heterogeneous plastics, % w/w) | 95.2 | 97.1 | 98.4 | UNI EN ISO11357 - 3 |
| Cl (% ss) | 0.36 | 0.21 | 0.11 | UNI EN 15408: 2011 |
| S (% ss) | 0.08 | 0.06 | 0.05 | UNI EN 15408: 2011 |
| Pb (mg/Kg) | 10 | 4.5 | 2.5 | UNI EN 15411: 2011 |
| Hg (mg/Kg) | 0.43 | 0.25 | 0.11 | UNI EN 15411: 2011 |
| Cd (mg/Kg) | 2.5 | 0.9 | 0.5 | UNI EN 15411: 2011 |

Advantageously, such selection operations allow, starting from a heterogeneous flow of plastics deriving, for example, from urban collection of domestic waste, to eliminate the non-polymeric fractions that would otherwise compromise properties such as lower calorific value, density and pneumatic transportability.

In some embodiments, the fragmented material, possibly deprived of some components by the primary separation operations, can be stored for later use.

The method of the present invention also comprises a plastification, or densification, operation in which the fragmented material is processed to obtain a densified material.

With the term "plastification" or its derivatives, such as "plastifier" or "plastified", we mean a process through which the polymeric fraction of the primary heterogeneous mixture, or even only part of it, is taken to the melting point, so that it is thickened and homogenized, for example due to thermal heating effect and due to friction effect caused by rubbing. Here and hereafter in the description, the term "densification" or its derivatives, such as "densifier" or "densified", or the term "agglomeration" or its derivatives, such as "agglomerate" and "agglomerator", can also be used in an equivalent manner as a substitute for "plastification" or its derivatives, such as "plastifier" or "plastified".

In some embodiments, such plastification operation can be performed using an extruder, possibly a twin-screw extruder.

In some embodiments, such operation can be performed for example by feeding the fragmented material by means of a hopper into the plastifier, for example into the extruder, which can work in a variable temperature range, suitable to melt the materials that make up the fragmented material.

In some embodiments, the Applicant has determined that the plastification or densification temperature for obtaining a product with optimal physical characteristics is between 200° C. and 300° C., preferably between 220° C. and 280° C. The densification, carried out downstream of the selection mentioned above, allows to obtain a homogeneous product with excellent properties of pneumatic transportability, high hardness and tensile strength, high internal cohesion between the various types of polyolefins.

In other possible embodiments, the polymeric product of the present invention can have a density which, expressed as bulk density, thanks to the densification can be higher than 200 Kg/m$^3$, in particular higher than 250 Kg/m$^3$, in particular higher than 300 Kg/m$^3$, even more particularly higher than 350 Kg/m$^3$ measured in accordance with UNI EN ISO 61 standard. The densified material can be directly cut or sectioned to measure at exit from the plastifier, for example by means of shears, to obtain densified material of variable shapes and dimensions, as a function of an exit section of the plastifier and the cutting frequency. In some embodiments, the method of the present invention provides, as mentioned, a cooling step by quenching the densified material, in the shapes and dimensions made available downstream of the plastifier, for example in the form of ingots or other suitable forms. Quenching is advantageously carried out at least by air cooling carried out with pneumatic transport.

In one embodiment, the quenching provides that the hot densified material is subjected to a granulation process able to maximize the heat exchange and air cool the polymeric product, while it is pneumatically transported. The granulator or shredder in question is to be intended as consisting of a feed section, a casing containing a blade rotor, an evacuation section and the pipe for evacuating the material. Advantageously, the cooling of the material is maximized by the flow rate of air drawn from the zone of evacuation of the material by the rotor of the granulator. The flow of air taken from the point of evacuation of the material allows to put the shredder under vacuum, to guarantee the maximum circulation of air between the rotor and the material during the volumetric reduction, and to guarantee a high heat exchange in the pipe for evacuating the flow of polymeric material moved by air. The granulator is hermetically isolated as a whole. With these operating conditions, the material is fed to the mill at a temperature higher than 170° C., preferably higher than 180° C., and is extracted at a temperature lower than 60° C., preferably lower than 50° C. Furthermore, the heat exchange for cooling purposes can advantageously be made possible also by the water cooling circuit of the blade rotor which shreds the densified polymeric material.

In another embodiment, the quenching is carried out by means of the granulation process as above, mixing the hot densified material with an auxiliary plastic additive, which has a moisture content able to speed up the cooling of the polymeric product without compromising its properties.

In some embodiments, the method of the present invention can provide, at the same time as or after cooling, to fragment the polymeric product in a suitable fragmentation device. For example, the fragmentation can be a grinding, which can typically be carried out by means of a mill. Favorably, if the fragmentation is carried out at the same time as, and for the purpose of, quenching, such fragmentation can be carried out by means of the granulation process as above.

The polymeric product can therefore be fragmented into the desired sizing, to obtain a polymeric product in the desired fragmented form, for example in the form of granules, grains, particles or similar fragmented forms, hereinafter called by way of example granules.

In some embodiments, the granules of polymeric product can have sizing comprised between 0.01 mm and 300 mm.

In possible implementations, the granules of polymeric product can have sizing comprised between 0.01 mm and 3 mm. For example, the granules with this sizing can be used for insufflation.

In other possible implementations, the granules of polymeric product can have sizing comprised between 3 mm and 10 mm. For example, granules with this sizing can also be used for insufflation.

In yet other possible implementations, the granules of polymeric product can have sizing comprised between 10 mm and 300 mm. For example, the granules with this other sizing can be used for loading, for example into a basket or hopper.

In some embodiments, the method of the present invention provides screening the fragmented polymeric product, for example in granules, so as to obtain a polymeric product of uniform sizing.

In some embodiments, the polymeric product can be stored in a storage chamber, or in a pit, in which it is kept in contact with the surrounding air.

Pit storage is advantageous, for example compared to silo storage, as it further promotes the heat exchange and cooling of the polymeric product in contact with air.

In some embodiments, the method of the present invention can provide to mix the fragmented material, the so-called leaf, with a polymeric corpuscular material, before carrying out the plastification.

This mixing can take place after the initial fragmentation, after the primary selection or at the same time as the step of storing the fragmented material.

In some embodiments, the polymeric corpuscular material can have fine dimensions and sizing, or in any case smaller than those of the fragmented material.

Advantageously, this characteristic allows to improve the efficiency of the plastification process, since the empty volumes of the fragmented material are reduced. For example, if a twin-screw extruder is used for the plastification, the empty volumes comprised between one head end and the other of the screws of the extruder are advantageously reduced.

Advantageously, the filling of the hollow spaces between the heterogeneous polyolefin shredded leaves and the head ends of the screws of the extruder with the polymeric corpuscular material, allows to considerably optimize the process, eliminating gaseous inclusions, homogenizing the flow of processed material, maximizing the density of the polymeric product obtained and increasing productivity.

In some embodiments, the polymeric corpuscular material can comprise discarded granules of polymeric product, for example downstream of operations of separation of process water.

In particular, the polymeric corpuscular material can comprise a part of material with nominal dimensions smaller than 20 mm and another part of material with nominal dimensions smaller than 3 mm.

In some embodiments, such polymeric corpuscular material can come from other waste treatment processes, or from scraps of plastic material that derive from other production cycles.

In some embodiments, the polymeric corpuscular material can comprise scraps coming from plastic treatment production cycles.

In other embodiments, the polymeric corpuscular material can come from water treatment operations.

In such operations, typically, water containing plastic material is filtered to remove the polymeric corpuscular material on the basis of the dimensions, sizing, weight, density.

For example, such operations can be performed by making a flow of water pass through a filter comprising two discoidal membranes located in reciprocal co-rotation. The water channeled between the two membranes flows toward the outside of the filter, leaving inside a polymeric corpuscular material with a diameter greater than the dimensions of the meshes of the filter.

Many other ways to obtain the polymeric corpuscular material are also possible.

Based on the type of components comprised in the water to be purified, or in the waste material to be screened, the polymeric corpuscular material can comprise shredded fragments of polyolefins or other polymers.

The polymeric corpuscular material may consist of the fine fraction of the polymeric product itself, obtained from the screening operation downstream of the shredding. By way of example, the polymeric corpuscular material can consist of the fraction smaller than 2 mm removed during the screening process downstream of the shredding.

Advantageously, the presence of shredded fragments of polyolefins or other polymers contributes to increase the calorific value of the final polymeric product, improving its efficiency for possible uses as fuel.

Advantageously, the density and compactness of the final polymeric product can be regulated by the quantity of possible shredded fragments of other materials present in the polymeric corpuscular material.

These and other characteristics therefore allow the method of the present invention to be flexible, and to be used also in an integrated manner with respect to other methods or cycles for producing plastic materials.

Furthermore, such characteristics allow to make the method of the present invention more efficient for the purposes of disposal, recycling and re-use of waste materials, since materials of different types and origin can be treated.

It is also possible, before the plastification step, to add one or more additives to the fragmented material, for example materials suitable to confer specific density, composition, mechanical properties and/or functions to the final polymeric product.

For example, it is possible to add a ferrous matrix compound, which can mainly consist of iron oxides, which can adapt for example to steel industry applications.

In possible implementations, it can be provided to add to the fragmented material, before the plastification step, a quantity lower than 50%, preferably lower than 35%, even more preferably lower than 20% on dry weight of the fragmented material subjected to the primary selection, of a product consisting mainly of iron oxides deriving from the rolling process of metal products, preferably consisting of at least 80% on dry weight of Fe oxides, preferably at least 85% on dry weight, even more preferably at least 90% on dry weight. For example, such ferrous matrix compound can be in a fine sizing ranging from 0 to 5 mm.

Another example of possible additives added before the plastification are additives containing desiccants or in general agents for controlling or reducing moisture.

Such additives, for example with a ferrous matrix and/or containing desiccants or agents for controlling or reducing moisture, can also be added in combination with each other in the embodiments described here.

In the embodiments of the present invention which provide quenching in order to carry out the cooling, the densified material can be mixed with an auxiliary plastic additive, which has a lower temperature, in order to cool it quickly, stabilizing its chemical structure.

In some embodiments, the auxiliary plastic additive can have composition and density characteristics similar to those of the densified material, but a lower temperature.

In some embodiments, the auxiliary plastic additive can comprise cold final product previously obtained by means of embodiments of the method described here.

In alternative embodiments, the auxiliary plastic additive can come from other operations associated with the treatment of materials from production processes that are not completely dissimilar.

For example, the auxiliary plastic additive can come from processes that provide to select plastic materials by means of flotation operations on water, considered at ambient temperature and pressure.

In such operations, typically, various components of a suspension comprising plastic materials are separated on the basis of their physical characteristics, such as weight, density, porosity, hygroscopicity and/or absorption of water and/or gas in general.

Such operations are typically performed by means of flotation tanks, or flotation cells.

In some possible variants, these operations can also comprise the insufflation of gas into the liquid, so that the solid components that have greater affinity with the gas are brought to the surface (floating material), while the heavier components, or those that have greater affinity with the liquid, precipitate toward the bottom of the tank (sinking material).

When these operations are carried out at the same time as processes of production, recycling or separation of plastic materials, the sinking material can comprise plastic materials compatible and analogous with the polymeric product of the present invention.

In some embodiments, the sinking materials can be used as an auxiliary plastic additive in the quenching operations of the densified material.

In some embodiments, the auxiliary plastic additive can have a controlled moisture content, able to speed up the cooling of the polymeric product without compromising its properties. During granulation, the granulated polymeric product will release a quantity of heat at least equal to the latent heat necessary to reduce the moisture content of the auxiliary plastic additive, taking it to a content lower than 1%, preferably lower than 0.5%. The heat transfer of the polymeric product entails a lowering of the equilibrium temperature of the flow of plastic additive and of the polymeric product in a very short time.

Possibly, the water content can be regulated by means of drying operations in order not to exceed possible limits and regulations provided in the procedures in which the final polymeric product is used.

In some embodiments, the auxiliary plastic additive presents itself as a high density plastic material, comprising for example a styrene fraction and/or polyethylene terephthalate (PET), and/or high density polyethylene (HDPE) or mixtures thereof, or other types of combinations thereof.

In some embodiments, the auxiliary plastic additive has a higher density than the density of water at ambient temperature and pressure.

Advantageously, the auxiliary plastic additive thus obtained, when mixed with the densified material, prevents its conglomeration, limiting or completely blocking possible melting reactions that may occur on hot surfaces.

This characteristic allows to limit, or completely prevent, the conglomeration of the densified material.

Advantageously, the controlled moisture content contributes to reducing the temperature of the densified material, favoring heat exchange also thanks to possible evaporation processes.

In addition, when the moisture present in the auxiliary plastic additive comes into contact with the hot densified material, it can promote surface crystallization increasing its pneumatic transportability and efficiency of use.

This characteristic is advantageous in cases where the polymeric product needs to be introduced by means of burners or lances into apparatuses for producing metal products, such as for example electric arc furnaces.

It is clear that modifications and/or additions of steps may be made to the method as described heretofore, without departing from the field and scope of the present invention.

It is also clear that, although the present invention has been described with reference to some specific examples, a person of skill in the art shall certainly be able to achieve many other equivalent forms of method, having the characteristics as set forth in the claims and hence all coming within the field of protection defined thereby.

The invention claimed is:

1. Method to produce a polymeric product, said method comprising:
   fragmentation into desired sizing of a primary heterogeneous mixture comprising polymeric material, obtaining a fragmented material of the desired sizing;
   mechanical primary selection, waterless, of said fragmented material to remove metallic material, non-polyolefin polymers and non-polymeric foreign fraction;
   subjecting said fragmented material to plastification, obtaining a densified material;
   subjecting said densified material to quenching at least by air cooling carried out with pneumatic transport, thus obtaining a densified and cooled material which constitutes said polymeric product.

2. Method as in claim 1, characterized in that said quenching provides that the hot densified material, transported pneumatically for air cooling purposes, is simultaneously subjected to a granulation process able to maximize the heat exchange and cool the polymeric product.

3. Method as in claim 2, characterized in that the hot densified material is subjected to said granulation process together with an auxiliary plastic additive that has a moisture content able to speed up the cooling of the polymeric product.

4. Method as in claim 3, characterized in that the auxiliary plastic additive comprises a styrene fraction and/or polyethylene terephthalate (PET), and/or high-density polyethylene (HDPE), or mixtures thereof.

5. Method as in claim 3, characterized in that said auxiliary plastic additive has a density greater than water density considered at ambient temperature and pressure.

6. Method as in claim 1, characterized in that the plastification temperature is between 200° C. and 300° C., in particular between 220° C. and 280° C.

7. Method as in claim 1, characterized in that the densified and cooled polymeric product has a bulk density higher than 200 Kg/m$^3$, in particular higher than 250 Kg/m$^3$, in particular higher than 300 Kg/m$^3$, even more particularly higher than 350 Kg/m$^3$ measured in accordance with UNI EN ISO 61 standard.

8. Method as in claim 1, characterized in that said primary heterogeneous mixture comprises two or more chosen from the following polymers: polyethylene (PE), polypropylene (PP), high-density polyethylene (HDPE), low-density polyethylene (LDPE), polyethylene terephthalate (PET).

9. Method as in claim 1, characterized in that said primary heterogeneous mixture comprises virgin and/or waste materials and/or plastic waste.

10. Method as in claim 1, characterized in that a mixing of said fragmented material with a polymeric corpuscular material, with dimensions and sizing smaller than those of said fragmented material, is provided before the plastification.

11. Method as in claim 10, characterized in that said polymeric corpuscular material comprises shredded fragments of polyolefins or other polymers.

12. Method as in claim 1, characterized in that the polymeric product obtained has a calorific value no lower than 20 MJ/Kg, in particular no lower than 30 MJ/Kg, referred to the dry sample after 4 hours of drying at 105° C., in accordance with UNI EN 15400 standard.

13. Method as in claim 1, characterized in that the polymeric product obtained comprises a chlorine content not higher than 3.5%, in particular at 0.8% in weight on the dry sample of polymeric product after 4 hours of drying at 105° C., in accordance with UNI EN 15408 standard.

14. Method as in claim 1, characterized in that said polymeric product obtained comprises a polymeric fraction higher than 50%, preferably higher than 65%, more preferably higher than 80%, even more preferably higher than 90% in weight on the dry sample of polymeric product, and a non-polymeric fraction in complementary percentage.

15. Method as in claim 1, characterized in that, before the plastification, it provides to add to said fragmented material a quantity lower than 50%, preferably lower than 35%, even more preferably lower than 20%, on dry weight of the fragmented material subjected to said primary selection, of a product consisting mainly of iron oxides deriving from the rolling process of metal products, in particular preferably consisting of at least 80% on dry weight of Fe oxides, preferably at least 85% on dry weight, even more preferably at least 90% on dry weight.

* * * * *